UNITED STATES PATENT OFFICE.

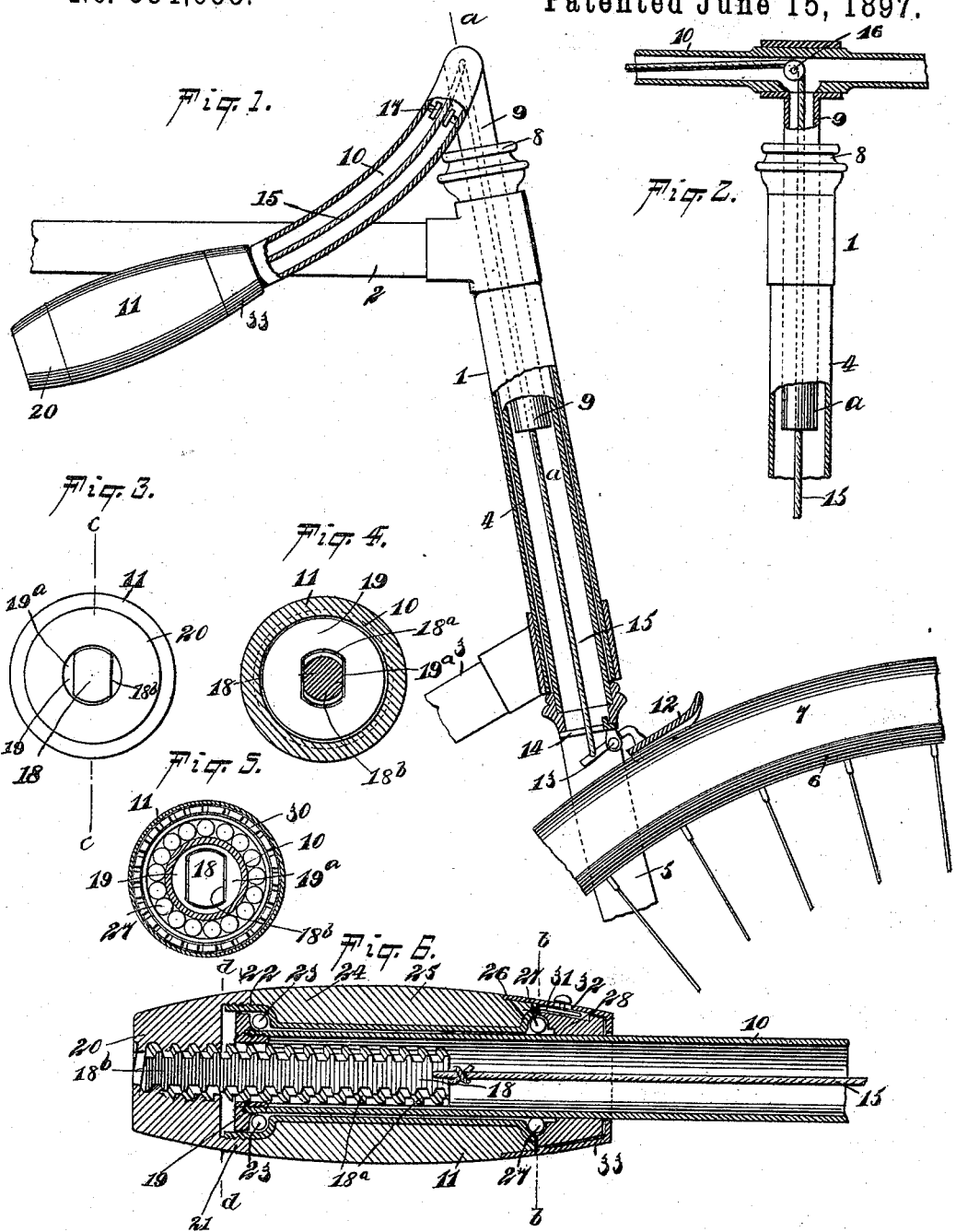

WILLIAM HORACE HART, OF VANCOUVER, WASHINGTON.

BICYCLE-BRAKE.

SPECIFICATION forming part of Letters Patent No. 584,635, dated June 15, 1897.

Application filed April 30, 1896. Serial No. 589,681. (No model.)

*To all whom it may concern:*

Be it known that I, WILLIAM HORACE HART, of Vancouver Barracks, in the county of Clarke and State of Washington, have invented a new and Improved Bicycle-Brake, of which the following is a full, clear, and exact description.

This invention relates to certain improvements in the brakes of bicycles and similar vehicles, and has for its object to provide a brake of a simple and inexpensive nature which shall be light and compact in construction and inconspicuous when in place for use and which shall be adapted to be mounted in such a position on the vehicle as to be ready for use at all times.

The invention comprises a brake-shoe adapted to be pressed against the wheel-tire or other moving part of the vehicle to retard the movement thereof, a handle mounted to turn on the handle-bar, and a connection between the brake-shoe and the handle whereby the former is actuated by the turning of the latter.

The invention also contemplates certain novel features in the construction, combination, and arrangement of the various parts of the improved brake whereby certain important advantages are attained and the device is made simpler, cheaper, and otherwise better adapted and more convenient for use than various other similar devices heretofore employed, all as will be hereinafter fully set forth.

The novel features of the invention will be carefully defined in the claims.

Reference is to be had to the accompanying drawings, forming a part of this specification, in which similar characters of reference indicate corresponding parts in all the views.

Figure 1 is a fragmentary side view, partly in section, showing the forward portion of a bicycle provided with a brake constructed in accordance with my invention. Fig. 2 is a sectional view taken on the line *a a* of Fig. 1, showing a fragment of the steering-head bearing and handle-bar, illustrating the arrangement of the connection between the handle and brake-shoe. Fig. 3 is an end view of the handle on the handle-bar for operating the brake-shoe. Fig. 4 is a sectional view taken through said handle. Fig. 5 is a sectional view taken through the handle in the plane indicated by the line *b b* in Fig. 6. Fig. 6 is a section taken longitudinally through the handle in the plane indicated by the line *c c* in Fig. 3, and Fig. 7 is a fragmentary sectional view showing a modified arrangement of the brake device.

Referring first to Figs. 1 to 6, 1 indicates the head-bearing of the bicycle-frame, extending downward between the upper brace-bar 2 and lower diagonal brace-bar 3. In the head-bearing is mounted to turn in the usual way the steering-post 4, having forks 5 at its lower end, wherein is mounted to turn the steering-wheel, having a rim 6, provided with a pneumatic tire 7. The upper end of the steering-post 4 is provided with a clamping device 8 for clamping the stem 9 of the handle-bar adjustably in said steering-post, and said handle-bar is provided with horizontal members or arms 10, extending on opposite sides of the frame in the ordinary way, the ends of said arms being provided with grips or handles 11, as clearly shown in Fig. 1.

12 indicates a brake-shoe or spoon mounted on the end of a brake-lever pivoted at 13 to a bearing 14, extending across the crown of the forks, said lever having its free end connected to the lower end of a cord or flexible connection 15, which extends up through the hollow of the steering-post 4 and also through the hollow of the stem 9 of the handle-bar, being arranged to run over a roller or pulley 16, mounted to turn in the central portion of the handle-bar, as clearly shown in Fig. 2, whence said connection passes over through one arm 10 of the handle-bar, preferably to the right of the rider operating the machine.

The extremity of the cord 15 passes over another sheave or roller 17, arranged in the downwardly-extending portion of the arm 10 of the handle-bar, and its extremity is connected to a screw 18, arranged in the end portion of said arm 10, as clearly shown in Fig. 6, said screw being provided with screw-threads 18$^a$ and having its opposite sides flattened or otherwise formed into guideways 18$^b$, adapted to be engaged by the flattened side portions 19$^a$ of a bearing-piece mounted in the end of the arm 10, as clearly shown in the drawings, whereby it will be seen that said screw is guided longitudinally and held against turning in the end of said arm.

The screw 18 projects slightly beyond the end of the arm 10 of the handle-bar and is adapted to be engaged in the interior threads formed in a nut 20, having a projecting interiorly-threaded flange 21, screwing on the shouldered end portion 22 of a sleeve extending through and secured in the hollow of the grip 11, the body portion 25 of which may be formed of cork or other suitable material in the ordinary way. The shouldered end portion 22 of the sleeve forms a cone 24, adapted to receive a series of balls 23, held in place by a cone 19, having a projecting threaded portion arranged to screw in the open end of the handle-bar 10, as clearly shown in Fig. 6, and provided with a central opening for the passage of the screw 18, said opening being provided with flattened sides 19$^a$ to engage the flattened side face 18$^b$ of said screw, as shown in Figs. 4 and 5.

The sleeve, which extends through the hollow of the grip 11, is provided at its opposite end with an enlargement or shoulder 26, forming a cone adapted to receive balls 27, held between it and a cone 28, fixed on the handle-bar in any preferred way, said balls being in contact with the handle-bar at their inner surfaces, as clearly shown in Figs. 5 and 6.

In attaching the handle constructed as above described to the handle-bar 10 the cone 28 will first be slipped on the handle-bar and the balls inserted in the groove therein, after which the body portion of the grip will be slipped over the end of the handle, so that the cone 26 also engages the balls 27. The balls 23 will then be inserted and the cone 19 screwed into the end of the handle-bar, after which the nut 20 will be screwed onto the projecting end 22 of the sleeve of the grip in position to receive the screw 18. The cone 28 will then be adjusted so as to bring the required pressure upon the balls 27 and 23, as will be readily understood.

As herein shown, the nut 20 forms a finish or tip for the extremity of the grip or handle 11 similar to the finish ordinarily provided on cork grips, and a similar finish 33 is provided at the inner end of the handle or grip, being secured to the cone 28 and made to extend over the inner end of the grip, so as to hold the same in place. In the inner end of the grip 11 is formed an annular series of teeth 30, adapted to be engaged by a dog 31, mounted to move in a recess in one side of the cone 28 and having an operating-stem projecting through a slot 32 in the finish 33.

The operation of the device is as follows: When the brake is to be used, it is merely necessary to turn the grip or handle 11 so as to rotate the nut 20, held in the recess in the sleeve 21 of said grip or handle, whereby endwise movement of the screw 18 is effected, and this movement is imparted to the cord or connection 15 in such a way as to force the brake-shoe or spoon 12 into engagement with the wheel-tire 7, so as to retard the movement thereof. When it is not desired to use the brake, the dog 31 is moved by means of its stem into engagement with the teeth 30 of the grip or handle in such a way as to hold said grip against rotation on the arm 10 of the handle-bar. A sufficient number of rollers or sheaves 16 and 17 will be provided in the handle-bar to hold the cord or connection 15 out of engagement with the handle-bar to prevent excessive wear thereof.

In cases where it is desired to dispense with the spoon or brake-shoe 12 operating on the wheel-tire the construction shown in Fig. 7 may be employed. In this construction the lower end of the cord or connection 15 is extended downward, as indicated at 34, through the lower brace-bar 3 of the frame, being passed through an opening at the lower portion of the steering-post and head-bearing, and the extremity of said connection is coupled to one arm of an elbow-lever 35, pivoted adjacent to the crank-box 37 of the frame, wherein turns the crank-shaft 38. The opposite end or arm of the said elbow-lever is connected with a spring brake-band 36, secured at its opposite end in the crank-box and arranged in such a way that when the elbow-lever is moved pivotally said brake-band will be brought into vertical contact with the crank-shaft, so as to tend to stop the shaft against turning.

By the arrangement of the brake-band 36, as shown in Fig. 7, the operative parts of the brake are placed entirely out of view, so that the wheel has the appearance of being unprovided with a brake, and, moreover, said brake-band being arranged to engage the crank-shaft of the bicycle it is obvious that the wear resulting from the action of a brake-shoe or spoon such as that shown in Fig. 1 on a pneumatic tire is entirely prevented and the life of the tire is materially increased.

The grip or handle 11 being mounted on ball-bearings on the handle-bar 10 it is obvious that the power required in turning the handle is materially lessened, as is also the wear of the parts, and it will be seen that the construction is such as to make the device extremely simple and inexpensive and at the same time compact, light, and always in position for convenient use.

It will also be obvious that the invention is susceptible of considerable modification without material departure from its principles and spirit, and for this reason I do not wish to be understood as limiting myself to the precise form and arrangement of the various parts herein set forth.

Having thus described my invention, I claim as new and desire to secure by Letters Patent—

1. In a bicycle-brake-operating mechanism, the combination of a grip having a short section at the inner end fixed to the handle-bar and provided with a locking-latch for engaging the movable section, a rotatable section having the outer end thereof threaded to form a nut which turns therewith, with a bolt lying in the hollow of the handle-bar tube and having two opposite sides flattened, a cord or other attachment to the inner end of this bolt for conveying power to the brake, and a cap attached to the outer end of the handle-bar tube and having a hole therethrough for the passage of the bolt having an outline corresponding to that of the bolt and thus preventing its rotation, substantially as described.

2. In a rotatable bicycle-grip adapted to operate a brake, the combination of the rotatable shell of the grip surrounding the end of the handle-bar and provided with ball-bearings between, the outer end of the grip being formed as a nut which is entirely outside the end of the handle-bar, with a bolt adapted to fit said nut and flattened on its side or otherwise formed of non-circular outline, a cap or plate fitting over the end of the handle-bar tube and having a hole therethrough of non-circular outline corresponding to that of the bolt, said cap also forming the cone of one of the ball-bearings, substantially as described.

3. In a rotatable bicycle-grip adapted to operate a brake, the combination of the rotatable shell of the grip surrounding the end of the handle-bar and provided with ball-bearings between, a short inner section fixed to the handle-bar and provided with a cap whereby it may be locked to the rotating shell or section of the grip, the outer end of the grip being formed as a nut which is entirely outside the end of the handle-bar, with a bolt adapted to fit said nut and flattened on its side or otherwise formed of non-circular outline, a cap or plate fitting over the end of the handle-bar tube and having a hole therethrough of non-circular outline corresponding to that of the bolt, said cap also forming the cone of one of the ball-bearings, substantially as described.

4. A bicycle-brake-operating mechanism, consisting of a grip mounted to rotate and held against longitudinal movement on the handle-bar, said grip having a bore in its outer end, the walls of which are threaded to act as a nut, a threaded bolt engaging said nut and prevented from turning, and a flexible connector extending from said bolt to the brake, substantially as described.

WILLIAM HORACE HART.

Witnesses:
W. H. WILHELM,
FRED W. SLADEN.